United States Patent
Mashimo et al.

(10) Patent No.: US 11,594,712 B2
(45) Date of Patent: Feb. 28, 2023

(54) METHOD FOR PRODUCING SECONDARY BATTERY ELECTRODES

(71) Applicant: Prime Planet Energy & Solutions, Inc., Tokyo (JP)

(72) Inventors: Naohiro Mashimo, Toyota (JP); Katsushi Enokihara, Toyota (JP); Haruka Shionoya, Toyota (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 0 days.

(21) Appl. No.: 17/676,713

(22) Filed: Feb. 21, 2022

(65) Prior Publication Data

US 2022/0271265 A1 Aug. 25, 2022

(30) Foreign Application Priority Data

Feb. 22, 2021 (JP) .............................. JP2021-026533

(51) Int. Cl.
*H01M 4/04* (2006.01)
*H01M 10/0525* (2010.01)
(Continued)

(52) U.S. Cl.
CPC ....... *H01M 4/0404* (2013.01); *H01M 4/0433* (2013.01); *B05D 3/12* (2013.01);
(Continued)

(58) Field of Classification Search
CPC .............. H01M 4/0404; H01M 4/0433; H01M 4/0435; H01M 4/8896; H01M 10/525; B05D 3/12; B05D 5/12
(Continued)

(56) References Cited

U.S. PATENT DOCUMENTS 11,094,942 B2 * 8/2021 Kim ................... H01M 10/058
2009/0325045 A1 * 12/2009 Miyahisa ............ H01M 4/0435
429/185

(Continued)

FOREIGN PATENT DOCUMENTS

JP 2012038528 A * 2/2012
JP 201377560 A 4/2013
(Continued)

*Primary Examiner* — Brian K Talbot
(74) *Attorney, Agent, or Firm* — Hauptman Ham, LLP (57) ABSTRACT

A method for producing secondary battery electrodes includes a step of preparing a moisture powder formed of aggregated particles that contain a plurality of electrode active material particles, a binder resin, and solvent, wherein the solid phase, liquid phase, and gas phase in at least 50 number % or more of the aggregated particles in the moisture powder form a pendular state or a funicular state; a step of forming a coating film composed of the moisture powder on an electrode current collector, while the gas phase remains present; a step of forming a depression in the coating film by carrying out, using a die having an elevation of prescribed height, depression/elevation transfer into the coating film; and a step of carrying out depression/elevation transfer, using a die having an elevation higher than the elevation of prescribed height, by pressing the higher elevation into the depression that has been formed.

4 Claims, 4 Drawing Sheets

(51) Int. Cl.
    *H01M 4/88*      (2006.01)
    *B05D 3/12*      (2006.01)
    *B05D 5/12*      (2006.01)
(52) U.S. Cl.
    CPC ............ *B05D 5/12* (2013.01); *H01M 4/0435* (2013.01); *H01M 4/8896* (2013.01); *H01M 10/0525* (2013.01)
(58) Field of Classification Search
    USPC ........................................ 427/98.4, 99.2, 115
    See application file for complete search history.

(56) References Cited

U.S. PATENT DOCUMENTS

| | | | |
|---|---|---|---|
| 2010/0084266 A1* | 4/2010 | Di Franco | H01M 4/661 |
| | | | 204/290.01 |
| 2014/0342225 A1 | 11/2014 | Isshiki et al. | |
| 2016/0118642 A1 | 4/2016 | Enokihara | |
| 2017/0077498 A1* | 3/2017 | Fukasawa | H01M 4/364 |
| 2018/0233738 A1* | 8/2018 | Jung | H01M 4/525 |

FOREIGN PATENT DOCUMENTS

| | | | |
|---|---|---|---|
| JP | 2015138619 A | | 7/2015 |
| JP | 201681871 A | | 5/2016 |
| JP | 2019057383 A | * | 4/2019 |
| KR | 20140073719 A | * | 6/2014 |

* cited by examiner

METHOD FOR PRODUCING SECONDARY BATTERY ELECTRODES

BACKGROUND OF THE INVENTION

1. Field of the Invention

The present disclosure relates to a method for producing secondary battery electrodes. The present application claims priority based on Japanese Patent Application No. 2021-026533 filed on Feb. 22, 2021, the entire contents of which are incorporated in the present specification by reference.

2. Description of the Related Art

Secondary batteries such as lithium ion secondary batteries are lighter and have higher energy densities than conventional batteries and as a result are advantageously used as high-output vehicle-mounted power sources and as power sources for personal computers and mobile terminals. Lithium ion secondary batteries are advantageously deployed in particular as high-output drive power sources for vehicles such as battery electric vehicles (BEVs), hybrid electric vehicles (HEVs), and plug-in hybrid electric vehicles (PHEVs).

In a typical structure for the positive electrode and negative electrode (referred to simply as the "electrode" or "electrodes" in those cases where there is no particular distinction between the positive and negative electrodes) provided in this type of secondary battery, for example, a layer of an electrode active material, which has an electrode active material as its main component, is formed on one or both sides of a foil-shaped electrode current collector. This electrode active material layer is generally formed by coating a surface of the electrode current collector with an electrode material (referred to as an electrode mixture) including solvent and a solid fraction, e.g., the electrode active material, a binder resin, and so forth, followed by drying and then optionally pressing.

The increasingly widespread use of secondary batteries has been accompanied by demands for higher levels of performance. One method known for enhancing the performance is to place depressions and elevations in the electrode active material layer of an electrode for the purpose of, e.g., relaxing the stresses generated by expansion of the electrode active material (refer, for example, to Japanese Patent Application Laid-open No. 2015-138619).

With regard to the method for forming these depressions and elevations in the electrode active material layer, Japanese Patent Application Laid-open No. 2015-138619 discloses an art in which a negative electrode active material mixture paste containing particles of a negative electrode active material, is coated and dried on a negative electrode current collector to form a negative electrode active material layer, followed by supplying a solvent to the thereby formed negative electrode active material layer and pressing a relief pattern-bearing die into the above negative electrode active material layer to transfer the relief pattern.

SUMMARY OF THE INVENTION

Otherwise, it is thought that the performance of a secondary battery can be enhanced by placing a depression with a high aspect ratio (i.e., a hole having a larger depth than the diameter of the opening, a groove having a larger depth than width, and so forth) in the electrode active material layer of the electrode. Specifically, it is difficult for the charge carrier (for example, the Li ion) that diffuses within the electrode active material layer to reach to the region, in the vicinity of the electrode current collector, of the electrode active material layer. Diffusion of the charge carrier to the vicinity of the electrode current collector can therefore be facilitated by placing a depression in the electrode active material layer. However, when a depression is placed in the electrode active material layer, electrode active material is then not present in this region and as a result the capacity declines. It is therefore thought that diffusion of the charge carrier to the vicinity of the current collector could be facilitated, while restraining the decline in the capacity, if a high-aspect-ratio depression were to be placed in the electrode active material layer of the electrode.

However, when relief pattern transfer is undertaken using the conventional art described in Japanese Patent Application Laid-open No. 2015-138619, the problem arises that the electrode active material layer is compressed and densified (compacted) and it is difficult as a consequence to form a high-aspect-ratio depression in the electrode active material layer.

The present disclosure was accomplished considering this circumstance, and the primary object of the present disclosure is thus to provide a method that can produce a secondary battery electrode that is provided with an electrode active material layer that has a high-aspect-ratio depression.

In order to realize this object, a method is provided for producing secondary battery electrodes. The herein disclosed method for producing secondary battery electrodes includes a step of preparing a moisture powder that is formed by aggregated particles that at least contain a plurality of electrode active material particles, a binder resin, and solvent, wherein a solid phase, liquid phase, and gas phase in at least 50 number % or more of the aggregated particles in the moisture powder form a pendular state or a funicular state; a step of forming, using this moisture powder, a coating film composed of the moisture powder, on an electrode current collector, while the gas phase remains present; a step of forming a depression in the coating film by carrying out, using a die having an elevation of prescribed height, depression/elevation transfer into a surface region of the coating film that has been formed; a step of carrying out depression/elevation transfer, using a die having an elevation higher than the elevation of prescribed height, by pressing the higher elevation into the depression that has been formed; and a step of forming an electrode active material layer by removing the solvent.

This construction makes possible the production of a secondary battery electrode that is provided with an electrode active material layer that has a high-aspect-ratio depression.

Here, it is desirable that if the bulk specific gravity measured by placing an amount (g) of the moisture powder in a container having a prescribed volume (mL) and then leveling the moisture powder without applying a force is referred to as the loose bulk specific gravity X (g/mL), and the specific gravity calculated from the composition of the moisture powder on the assumption that no gas phase is present is referred to as the true specific gravity Y (g/mL), then the ratio of the loose bulk specific gravity X and the true specific gravity Y (Y/X) is 1.2 or more.

In a desired aspect of the herein disclosed method for producing secondary battery electrodes, the step of carrying out depression/elevation transfer is carried out such that the aspect ratio of the depression formed by the step of forming a depression is increased more than 1-fold and not more than 2-fold.

This construction makes it particularly difficult for the problem of coating film attachment to the die to occur.

In a desired aspect of the herein disclosed method for producing secondary battery electrodes, the dies used in the step of forming a depression in the coating film and the step of carrying out depression/elevation transfer are each a roll die.

This construction makes it possible to carry out the continuous production of a secondary battery electrode.

BRIEF DESCRIPTION OF THE DRAWINGS

FIG. 2A to FIG. 2D are explanatory diagrams that schematically show the state of presence of the solid phase (solid fraction, e.g., active material particles), liquid phase (solvent), and gas phase (voids) in the aggregated particles that form the moisture powder, wherein FIG. 2A indicates a pendular state, FIG. 2B indicates a funicular state, FIG. 2C indicates a capillary state, and FIG. 2D indicates a slurry state;

DESCRIPTION OF THE PREFERRED EMBODIMENTS

Examples of embodiments of the herein disclosed method for producing secondary battery electrodes are described in detail in the following, using as examples electrodes that are favorably employed in lithium ion secondary batteries, which are typical examples of secondary batteries.

Matters other than those explicitly mentioned in the present specification but which are essential for carrying out the invention are matters that a person skilled in the art could understand to be matters of design on the basis of the prior art in this technical field. Details of features disclosed here can be implemented on the basis of the matters disclosed in the present specification and common general technical knowledge in this technical field.

In the present specification, the expression "A to B" (where A and B are any values) that indicates a range has the meaning of not less than A and not more than B.

In the present specification, the term "lithium ion secondary battery" means a secondary battery in which movement of charge is borne by lithium ions in an electrolyte. In addition, the term "electrolyte body" means a structure that serves as a primary component of a battery constituted from a positive electrode and a negative electrode. In the present specification, the term "electrode" is used if there is no need to make a particular distinction between a positive electrode and a negative electrode. The term "electrode active material" (that is, positive electrode active material or negative electrode active material) means a compound capable of reversibly storing and releasing chemical species that serve as charge carriers (lithium ions in the case of a lithium ion secondary battery). The electrode active material may also be referred to simply as "active material".

Figure 1:
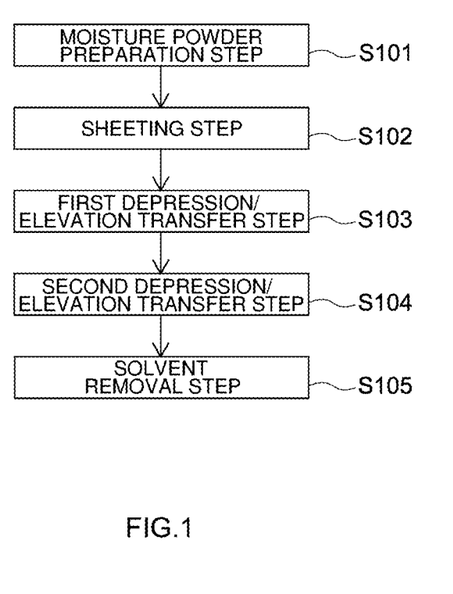
FIG. 1 is a flow chart that shows the main steps in the electrode production method according to an embodiment.

FIG. 1 shows each step in the method according to the present embodiment for producing secondary battery electrodes. The method according to the present embodiment for producing secondary battery electrodes includes the following: a step (moisture powder preparation step) S101 of preparing a moisture powder that is formed by aggregated particles that at least contain a plurality of electrode active material particles, a binder resin, and solvent, wherein a solid phase, liquid phase, and gas phase in at least 50 number % or more of the aggregated particles in the moisture powder form a pendular state or a funicular state; a step (sheeting step) S102 of forming, using this moisture powder, a coating film composed of the moisture powder, on an electrode current collector, while the gas phase remains present; a step (first depression/elevation transfer step) S103 of forming a depression in the coating film by carrying out, using a die having an elevation of prescribed height, depression/elevation transfer into a surface region of the coating film that has been formed; a step (second depression/elevation transfer step) S104 of carrying out depression/elevation transfer, using a die having an elevation higher than the elevation of prescribed height, by pressing the higher elevation into the depression that has been formed; and a step (solvent removal step) S105 of forming an electrode active material layer by removing the solvent.

As indicated by the preceding description of step S101 and step S102, moisture powder sheeting (MPS), in which film formation is performed using a moisture powder, is employed in the secondary battery electrode production method according to the present embodiment.

The moisture powder preparation step S101 will be described first. A moisture powder that is formed by aggregated particles that at least contain a plurality of electrode active material particles, a binder resin, and solvent, is prepared in the step S101. The solid phase, liquid phase, and gas phase in at least 50 number % or more of the aggregated particles in this moisture powder form a pendular state or a funicular state.

The individual components of the aggregated particles that form the moisture powder will be explained first. The electrode active material particles and binder resin contained in the aggregated particles are solid fractions.

Compounds having a composition that has been employed as a negative electrode active material or positive electrode active material in conventional secondary batteries (lithium ion secondary batteries in this instance) can be used as the particulate electrode active material that is used here. The negative electrode active material can be exemplified by carbon materials such as graphite, hard carbon, and soft carbon. The positive electrode active material can be exemplified by lithium transition metal composite oxides, e.g., $LiNi_{1/3}Co_{1/3}Mn_{1/3}O_2$, $LiNiO_2$, $LiCoO_2$, $LiFeO_2$, $LiMn_2O_4$, and $LiNi_{0.5}Mn_{1.5}O_4$, and by lithium transition metal phosphate compounds, e.g., $LiFePO_4$. The average particle diameter of the electrode active material is not particularly limited, but approximately 0.1 μm to 50 μm is suitable and approximately 1 to 20 μm is desired. In the present specification, the "average particle diameter" refers to the particle diameter (also referred to as $D_{50}$ or the median diameter) that corresponds to a cumulative frequency of 50 volume % from the small-diameter fine particle side in the volume-based particle size distribution based on a common laser diffraction/light scattering method. The number of electrode active material particles contained in an aggregated particle is a plurality.

The binder resin can be exemplified by polyvinylidene fluoride (PVDF), carboxymethyl cellulose (CMC), styrene-butadiene rubber (SBR), polytetrafluoroethylene (PTFE), and polyacrylic acid (PAA). A binder resin is used that is suitable in conformity to the solvent that is used.

The aggregated particles that form the moisture powder may contain, as a solid fraction, substances other than the electrode active material and binder resin. The examples of the solid fraction are a conductive material and a thickener.

For example, carbon materials such as carbon nanotubes and carbon black, e.g., acetylene black (AB), are advantageous examples of conductive materials.

For example, carboxymethyl cellulose (CMC), methyl cellulose (MC), and so forth can be desirably used as thickeners.

In addition, a solid electrolyte is used as a solid fraction when the electrode is an electrode of an all-solid-state battery. The solid electrolyte is not particularly limited, but desired examples are solid sulfide electrolytes for which the constituent components are, for example, $Li_2S$, $P_2S_5$, LiI, LiCl, LiBr, $Li_2O$, $SiS_2$, $B_2S_3$, $Z_mS_n$ (m and n are positive numbers and Z is Ge, Zn, or Ga), $Li_{10}GeP_2S_{12}$, and so forth.

In the present specification, "solid fraction" refers to the materials exclusive of solvent of the individual materials (solid materials) described in the preceding, and "solid fraction ratio" refers to the proportion taken up by the solid fraction in the electrode material provided by mixing all of the individual materials.

The solvent is the component that constitutes the liquid phase in the aggregated particles that form the moisture powder. There are no particular limitations on the solvent used, as long as the solvent can suitably disperse or dissolve the binder resin. Specifically, for example, N-methyl-2-pyrrolidone (NMP) or an aqueous solvent (water or a mixed solvent in which water is the main component) can be desirably used as the solvent.

Insofar as the effects of the present disclosure are not impaired, the aggregated particles that form the moisture powder may contain a material (for example, various additives) other than those that have been described in the preceding.

The state of the moist particles will now be described. The solid phase, liquid phase, and gas phase in at least 50 number % or more of the aggregated particles in the moisture powder form a pendular state or a funicular state.

Here, the state of presence (state of packing) of the solid fraction (solid phase), solvent (liquid phase), and voids (gas phase) in the aggregated particles that constitute the moisture powder can be classified into four states, i.e., a "pendular state", "funicular state", "capillary state", and "slurry state".

This classification is described in "Particle Size Enlargement", C. E. Capes (Elsevier Scientific Publishing Company, 1980), and is common knowledge at present. These four categories are also used in the present specification, and the herein disclosed moisture powder is thus clearly defined for the individual skilled in the art. These four categories are specifically described hereinbelow.

Figure 2:
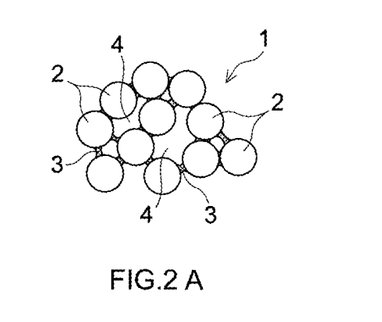

As shown in FIG. 2A, the "pendular state" is a state in which a solvent (liquid phase) 3 is present discontinuously so as to form bridges between the active material particles (solid phase) 2 in an aggregated particle 1, while the active material particles (solid phase) 2 can be present in an interconnected (continuous) state. As shown in the figure, the content of the solvent 3 is relatively low and as a result many of the voids (gas phase) 4 present in the aggregated particle 1 are present in a continuous manner to form continuous holes that run to the outside. A characteristic feature of this pendular state is that a continuous solvent layer residing over the entire outer surface of the aggregated particle 1 is not seen by electron microscopic observation (SEM observation).

As shown in FIG. 2B, the "funicular state" is a state in which the solvent content in the aggregated particle 1 is relatively higher than in the pendular state, and in which the solvent (liquid phase) 3 is present continuously around the periphery of the active material particles (solid phase) 2 in the aggregated particle 1. However, since the amount of solvent is still small, as in the pendular state, the active material particles (solid phase) 2 are present in an interconnected (continuous) state. On the other hand, the proportion, among the voids (gas phase) 4 present in the aggregated particle 1, of continuous holes that run to the outside is somewhat reduced and there is a tendency toward an increase in the proportion of presence of noncontinuous and isolated voids; however, continuous holes are observed to be present.

The funicular state is a state between the pendular state and the capillary state and can be divided into a pendular state-leaning funicular I state (i.e., a state in which the amount of solvent is relatively small) and a capillary state-leaning funicular II state (i.e., a state in which the amount of solvent is relatively large). This funicular I state encompasses a state in which a solvent layer is still not seen at the outer surface of the aggregated particle 1 in electron microscopic observation (SEM observation).

As shown in FIG. 2C, in the "capillary state", the solvent content in the aggregated particle 1 is increased, the amount of solvent in the aggregated particle 1 approaches the saturated state, and there is enough solvent 3 that it is present continuously at the perimeters of the active material particles 2; the active material particles 2 are present in a discontinuous state as a result. With regard to the voids (gas phase) in the aggregated particle 1, due to the increase in the amount of solvent, almost all of the voids (for example, 80 vol % of the total void volume) also is present as isolated voids and the proportion of presence of the voids in the aggregated particle also becomes small.

As shown in FIG. 2D, in the "slurry state", the active material particles 2 are already in a suspended state in the solvent 3 and this state is a state that cannot be called aggregated particles. There is almost no gas phase present.

Moisture powder film formation by sheeting using a moisture powder is already known, but in conventional moisture powder film formation, the moisture powder has been in the so-called "capillary state" shown in FIG. 2C, in which the liquid phase is continuously formed throughout the entire powder.

In contrast to this, the moisture powder prepared in the present embodiment is, due to control of the gas phase, placed in a state different from that for conventional moisture powders, and is a moisture powder in which the aforementioned pendular state and funicular state (particularly the funicular I state) are formed. These two states have a common feature that the active material particles (solid phase) 2 are liquid-bridged by the solvent (liquid phase) 3 and at least a portion of the voids (gas phase) 4 forms continuous holes that run to the outside. The moisture powder prepared in the present embodiment may also be, for convenience sake, referred to as a "gas phase-controlled moisture powder".

When the aggregated particles in this pendular state and funicular state are subjected to electron microscopic observation (for example, observation with a scanning electron microscope (SEM)), a layer of solvent is not observed on the outer surface of the aggregated particles, and in this case, desirably a layer of solvent is not observed on the outer surface of at least 50 number % or more of the aggregated particles.

The gas phase-controlled moisture powder can be produced by applying a process that produces conventional capillary-state moisture powder. Thus, a moisture powder that functions as an electrode material (electrode mixture) and resides in the aforementioned pendular state or funicular state (particularly the funicular I state), can be produced by adjusting the amount of solvent and blend of the solid fractions (e.g., active material particles, binder resin, and so forth) such that the proportion of the gas phase is larger than conventional one and specifically such that voids communicating to the outside (continuous holes) are abundantly formed in the interior of the aggregated particle.

In addition, a suitable affinity desirably exists between the surface of the powder material used and the solvent used in order to realize active material-to-active material liquid bridging with the minimum amount of solvent.

A desired gas phase-controlled moisture powder prepared in the moisture powder preparation step will be a moisture powder that has a value of at least 1.2 and desirably at least 1.4 (more desirably at least 1.6) and desirably not more than 2 for the "ratio Y/X between the true specific gravity Y and the loose bulk specific gravity X", which is calculated from the loose bulk specific gravity X (g/mL), which is the actually measured bulk specific gravity as measured by introducing the moisture powder into a container of prescribed volume and leveling the moisture powder without the application of force, and from the true specific gravity Y (g/mL) of the starting material base, which is the specific gravity calculated from the composition of the moisture powder assuming that no gas phase is present.

The gas phase-controlled moisture powder can be produced by mixing the individual components using a known stirring granulator (a mixer such as a planetary mixer).

Specifically, for example, the materials (solid components) excluding the solvent are first mixed in a solventless dry dispersion process. This serves to form a state in which the individual solid components are highly dispersed. This is followed by the addition, to this dispersed-state mixture, of the solvent and other liquid components (for example, liquid binder) and followed by additional mixing. A moisture powder in which the solid components are favorably mixed can be produced as a result.

Figure 3:
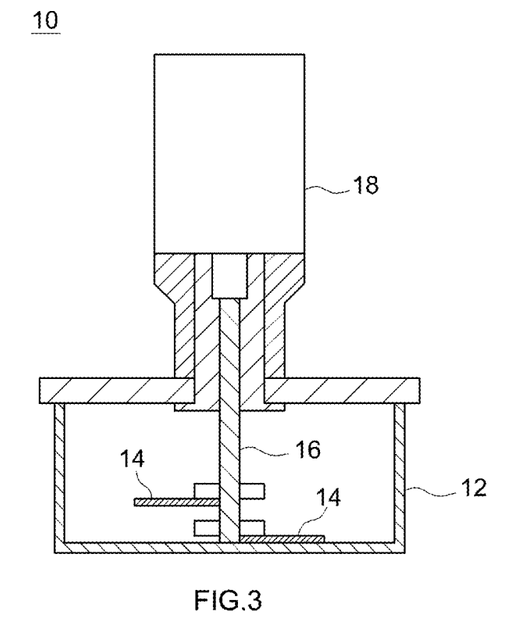
FIG. 3 is an explanatory diagram that schematically illustrates an example of a stirring granulator used in the moisture powder preparation step.

More specifically, a stirring granulator 10 as shown in FIG. 3 is prepared. This stirring granulator 10 is provided with a typically cylindrical mixing vessel 12, a rotating blade 14 housed within the mixing vessel 12, and a motor 18, which is connected through a rotating shaft 16 to the rotating blade (also referred to as a blade) 14.

A mixture of the individual solid fractions is produced as follows: the electrode active material, binder resin, and various additives (for example, thickener, conductive material, and so forth), which are solid fractions, are introduced into the mixing vessel 12 of the stirring granulator 10, the motor 18 is started, and the rotating blade 14 is rotated, for example, for about 1 to 60 seconds (for example, 2 to 30 seconds) at a rotational speed of 2,000 rpm to 5,000 rpm. A stirred granulation process is carried out while adding, to the mixing vessel 12, a suitable amount of solvent weighed so as to provide a solid fraction content of at least 70% and more desirably at least 80% (for example, 85 to 98%). While not intended as a particular limitation, the rotating blade 14 is further rotated, for example, for about 1 to 60 seconds (for example, 2 to 30 seconds) at a rotational speed of 100 rpm to 1,000 rpm. By doing this, the solvent can be mixed with the materials in the mixing vessel 12 and a moist granulate (moisture powder) can be produced. Continuing to briefly stir for a short period of time of approximately 1 to 5 seconds at a rotational speed of about 1,000 rpm to 3,000 rpm can prevent aggregation of the moisture powder.

The particle diameter of the obtained granulate can be a particle diameter larger than the width of the gap between the pair of rolls in the roll sheeting device described below. When the gap width is about 10 μm to 100 μm (for example, 20 μm to 50 μm), the particle diameter of the granulate can be at least 50 μm (for example, 100 μm to 300 μm).

Here, the solid phase, liquid phase, and gas phase in the target gas phase-controlled moisture powder form a pendular state or funicular state (desirably a funicular I state). As a consequence, the solvent content is sufficiently low (for example, the solvent content can be about 2 to 15 mass % or 3 to 8 mass %) so that a layer of solvent is not seen on the outer surface of the aggregated particle under electron microscopic observation, and, conversely, the gas phase fraction is relatively large.

In order to obtain such a state for the solid phase, liquid phase, and gas phase, the aforementioned granulate production procedure can incorporate various treatments or processes that can enlarge the gas phase. For example, during the stirring granulation or after granulation, excess solvent may be evaporated by exposing the granulate to a gas (air or an inert gas) atmosphere that has been dried and heated to approximately 10° C. to 50° C. above room temperature. In addition, in order to cause the formation of an aggregated particle that is in a pendular state or funicular I state, with a low solvent state, compression granulation with a relatively strong compression action may be used in order to induce adherence between/among active material particles and other solid components. For example, use may be made of a compression granulator that performs granulation in which compressive force is applied between the rolls while feeding the powder starting material between a pair of rolls from the vertical direction.

The sheeting step S102 will now be described. In this sheeting step S102, the moisture powder prepared as described in the preceding is used to form a coating film composed of this moisture powder on an electrode current collector, while the gas phase possessed by the moisture powder remains present.

The metal electrode current collectors used as electrode current collectors in this type of secondary battery can be used without particular limitation as the electrode current collector used in the sheeting step S102. When the electrode current collector is a positive electrode current collector, the electrode current collector may then be constituted, for example, of a highly conductive metal such as aluminum, nickel, titanium, or stainless steel. The positive electrode current collector is desirably made of aluminum and particularly desirably is aluminum foil. When the electrode current collector is a negative electrode current collector, the electrode current collector may then be constituted, for example, of a highly conductive metal such as copper, an alloy in which copper is the main component, nickel, titanium, or stainless steel. The negative electrode current collector is desirably made of copper and particularly desirably is copper foil. This thickness of the electrode current collector is, for example, about 5 μm to 20 μm and is desirably 8 μm to 15 μm.

Figure 4:
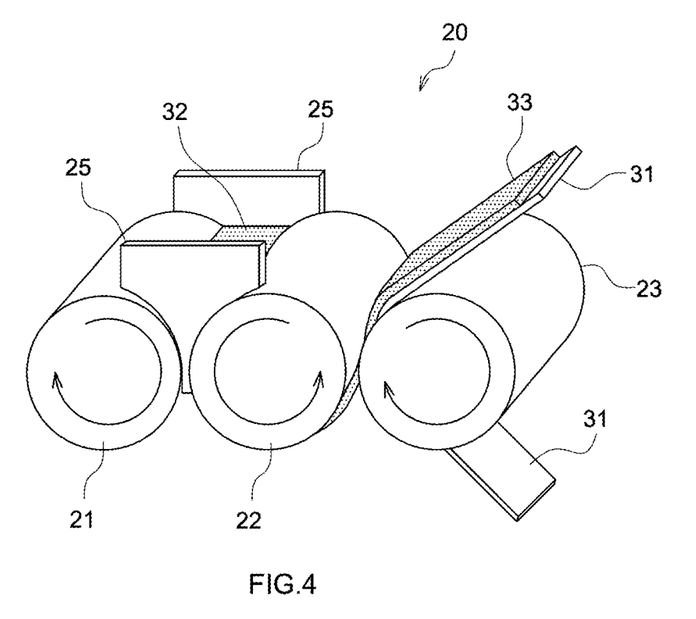
FIG. 4 is an explanatory diagram that schematically illustrates an example of the structure of a roll sheeting device used in the sheeting step.

Sheeting using the moisture powder will now be described. Sheeting using the moisture powder can be carried out using a known roll sheeting device. A favorable example of the sheeting device is a roll sheeting device 20 as schematically illustrated in FIG. 4. This roll sheeting device 20 is provided with a pair of rotating rolls 21, 22 composed of a first rotating roll 21 (referred to hereafter as the "supply roll 21") and a second rotating roll 22 (referred to hereafter as the "transfer roll 22"). The outer circumference of the supply roll 21 and the outer circumference of the transfer roll 22 face each other, and the rotating rolls 21, 22 in this pair can rotate in opposite directions as shown by the arrows in FIG. 4.

The supply roll 21 and the transfer roll 22 are separated by a distance that corresponds to the thickness desired for the electrode active material layer (coating film) 33 that is being sheeted onto the elongated sheet-shaped electrode current collector 31. That is, a gap of prescribed width is present between the supply roll 21 and the transfer roll 22, and the thickness of the coating film 33 which is composed of the moisture powder (electrode mixture) 32 and is being attached to the surface of the transfer roll 22 can be controlled by the size of this gap. The force for compressing the moisture powder 32 that is passing through between the supply roll 21 and the transfer roll 22 can also be adjusted by adjustment of the size of this gap. Therefore, the adoption of a relatively large gap size makes it possible to retain the gas phase in the moisture powder 32 (specifically in the individual aggregated particles) that has been produced in the pendular state or funicular state.

A barrier wall 25 is disposed at both ends in the width direction of the supply roll 21 and the transfer roll 22. This barrier wall 25 keeps the moisture powder 32 on the supply roll 21 and the transfer roll 22 and also functions to set, according to the distance between the two barrier walls 25, the width of the coating film (electrode active material layer) 33 that is being sheeted onto the electrode current collector 31. The electrode material (moisture powder) 32 is supplied by, for example, a feeder (not shown), to between these two barrier walls 25.

A back-up roll 23 is provided in the roll sheeting device 20 to serve as a third rotating roll adjacent to the transfer roll 22. This back-up roll 23 functions to transport the electrode current collector 31 to the transfer roll 22. The transfer roll 22 and the back-up roll 23 rotate in opposite directions as shown by the arrows in FIG. 4.

The supply roll 21, the transfer roll 22, and the back-up roll 23 are each connected to driving devices (motors) (not shown), which are independent from each other. By gradually raising the respective rotation rates of the supply roll 21, the transfer roll 22, and the back-up roll 23 in the indicated sequence, the moisture powder 32 can be transported along the transfer roll 22 and can be transferred, as the coating film 33, from the circumferential surface of the transfer roll 22 onto the surface of the electrode current collector 31 that has been transported by the back-up roll 23.

Figure 5:
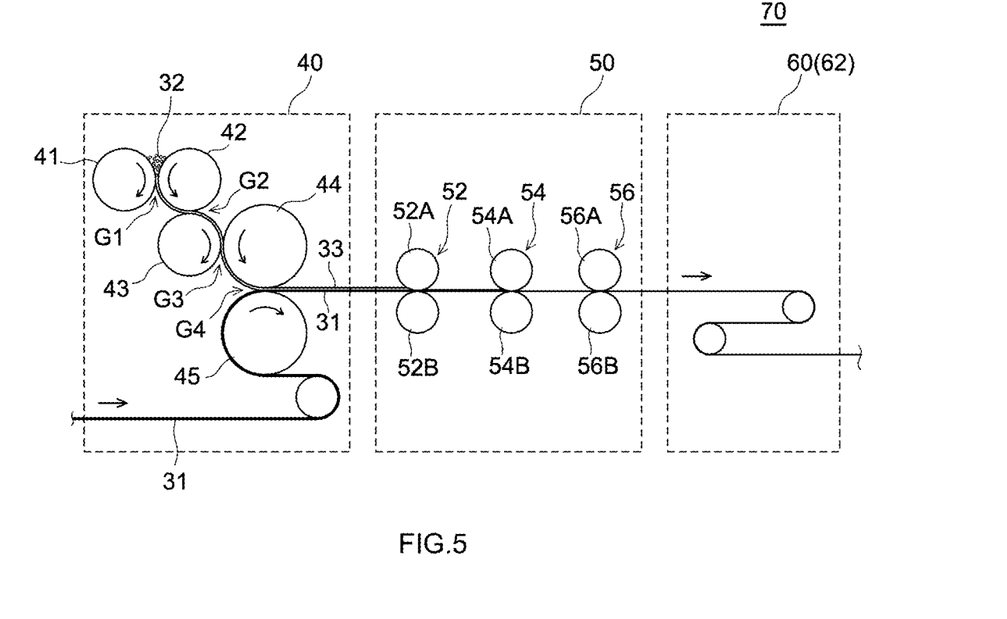
FIG. 5 is a block diagram that schematically illustrates the configuration of an electrode production apparatus suitable for execution of the electrode production method according to an embodiment.

It should be noted that the supply roll 21, the transfer roll 22, and the back-up roll 23 are disposed in FIG. 4 with their respective axes of rotation horizontally aligned; however, there is no limitation to this and the back-up roll may be provided, for example, in a position as shown in FIG. 5, infra (refer to FIG. 5).

While this is not a particular limitation, the sizes of the supply roll 21, the transfer roll 22, and the back-up roll 23 may be the same as in a conventional roll sheeting device, and each diameter thereof can be, for example, 50 mm to 500 mm. These three rotating rolls 21, 22, and 23 may have the same diameter or may have different diameters. In addition, the width over which the coating film is formed may be the same as in a conventional roll sheeting device, and can be determined as appropriate by the width of the target electrode current collector on which the coating film is formed. In addition, the material of the circumferential surface of these rotating rolls 21, 22, and 23 may be the same as the material of the rotating rolls in heretofore known roll sheeting devices, for example, SUS steel, SUJ steel, and so forth.

Proceeding in this manner and using a known roll sheeting device, sheeting can be carried out in a state in which the gas phase possessed by the moisture powder remains present, by transferring the coating film composed of the moisture powder onto the electrode current collector while adjusting the force that compresses the moisture powder 32 and the coating film composed thereof.

The first depression/elevation transfer step S103 will be described in the following. In the first depression/elevation transfer step S103, a depression is formed in the coating film by carrying out, using a die having an elevation (A) of prescribed height (depression/elevation transfer die), depression/elevation transfer into a surface region of the coating film that has been formed.

The height of the elevation refers to the length of the perpendicular line that drops from the top of the elevation to the base of the elevation.

Depression/elevation transfer can be carried out using a known method. The following are examples: a method in which a transfer die bearing a relief pattern having the elevation (A) of prescribed height is prepared and installed in a press device, and the transfer die is pressed into a surface region of the coating film; and a method in which a roll die provided with a relief pattern having the elevation (A) of prescribed height is prepared as the transfer die, and the roll die is rotated while transporting the electrode current collector bearing the sheeted-out coating film, so as to press the die into a surface region of the coating film.

The method using a roll die is desired because it enables depression/elevation transfer to be carried out continuously.

A depression is formed in the coating film by this depression/elevation transfer.

This coating film is a coating film composed of a moisture powder (gas phase-controlled moisture powder) that resides in the aforementioned pendular state or funicular state (desirably the funicular I state). As shown in FIG. 2A and FIG. 2B, the gas phase 4 is abundantly present in this coating film and this gas phase 4 forms continuous holes within the coating film. In addition, this is a state in which the active material particles 2 are bridged with each other by the solvent 3, and differs from the capillary state of FIG. 2C in that the active material particles 2 as a whole are not coated with solvent 3. Thus, when the coating film is subjected to pressure during depression/elevation transfer, the gas phase 4 is unlikely to remain as isolated bubbles and a large compressible space is present. In addition, movement of the active material particles 2 is facilitated because there is little resistance between an active material particle 2 and the solvent 3. The coating film composed of the gas phase-controlled moisture powder thus exhibits an excellent ductility.

There is thus very little densification (compaction) at the depression formed in the coating film in the first depression/elevation transfer step S103. As a consequence, the bottom of the depression formed in the first depression/elevation transfer step S103 is capable of additional compression and it is thus possible to deepen the depression by further pressing this bottom with a depression/elevation transfer die.

When, on the other hand, a high-aspect-ratio depression is formed by a single depression/elevation transfer, attachment of the coating film to the relief pattern-bearing die readily occurs and the rate of defect occurrence is high.

Thus, a depression with an aspect ratio desirably of not more than 1.5 and more desirably of not more than 1 is formed in the first depression/elevation transfer step S103.

The depth of the depression formed in the first depression/elevation transfer step S103 is not particularly limited, but is desirably at least 20% and not more than 80% of the thickness of the coating film.

An additional depression/elevation transfer is therefore carried out in the present embodiment in order to obtain a high-aspect-ratio depression. That is, a second depression/elevation transfer step S104 is performed. In this second depression/elevation transfer step S104, using a die having an elevation (B) that is higher than that of the elevation (A) of prescribed height on the die used in the first depression/elevation transfer step S103, depression/elevation transfer is carried out by pressing this higher elevation (B) (particularly the top of the elevation (B)) into the depression (particularly into the bottom of the depression) that was formed in the first depression/elevation transfer step 5103.

The "aspect ratio of the depression" in the present specification is an indicator of the depth of the depression and denotes the ratio of the depth of a depression to the short side or short diameter of its opening. For example, when the depression is a circular depression, the ratio of its depth to the diameter of its opening (depth/diameter of opening) is the "aspect ratio of the depression"; when the depression is a groove-shaped depression, the ratio of its depth to its width (depth/width) is the "aspect ratio of the depression".

Other than the elevation height of the elevation (B), the dimensions of the depression/elevation transfer die used in the second depression/elevation transfer step S104 may be the same as the dimensions, other than the elevation height of the elevation (A), of the depression/elevation transfer die used in the first depression/elevation transfer step S103, or may differ therefrom, and are desirably the same or smaller.

Other than having a different elevation height, the depression/elevation transfer die used in the second depression/elevation transfer step S104 may have the same pitch and pattern as the depression/elevation transfer die used in the first depression/elevation transfer step S103. In addition, when it is desired to deepen just some of the depressions, only elevations that correspond to those depressions, on the depression/elevation transfer die used in the second depression/elevation transfer step S104 may be made higher than the elevations on the depression/elevation transfer die used in the first depression/elevation transfer step S103.

Depression/elevation transfer in the second depression/elevation transfer step S104 can be carried out according to known methods. Methods that use a roll die as the transfer die used in the second depression/elevation transfer step S104 are desired because they enable the execution of a continuous depression/elevation transfer.

As noted above, the depression formed in the first depression/elevation transfer step S103 exhibits little densification (compaction). As a consequence of this, the depression formed in the first depression/elevation transfer step S103 can be deepened by pressing the transfer roll bearing the higher elevation (B) into the depression.

Moreover, the degree of densification (compaction) is still sufficiently small even for the depression that has been deepened in the second depression/elevation transfer step S104.

It is thus also possible to further increase the depth of such a depression by repeating depression/elevation transfer using a die that has an elevation (C) that is higher than the elevation (B) on the die used in the second depression/elevation transfer step S104. That is, the aspect ratio of the depression can also be made larger.

In addition, as described above, attachment of the coating film to the relief pattern-bearing die readily occurs, and the rate of defect occurrence is high, when a high-aspect-ratio depression is formed by a single depression/elevation transfer.

It is therefore desired that depression/elevation transfer in the second depression/elevation transfer step S104 be carried out so as to increase the aspect ratio of the depression in the range of more than 1-fold to not more than 2-fold (desirably at least 1.5-fold and not more than 2-fold) that of the first depression/elevation transfer step.

When the depth of the depression is to be increased thereafter by carrying out an additional depression/elevation transfer, depression/elevation transfer is likewise desirably carried out so as to increase the aspect ratio of the depression in the range of more than 1-fold to not more than 2-fold (desirably at least 1.5-fold and not more than 2-fold).

When a roll die is used in the first depression/elevation transfer step S103 and the second depression/elevation transfer step S104, the depression is desirably a groove that extends along the direction of transport for the electrode current collector. Doing this facilitates the formation of a high-aspect-ratio depression without causing attachment of the coating film to the roll die.

The solvent removal step S105 will now be described. In the solvent removal step S105, the electrode active material layer is formed by removing the solvent.

This solvent removal can be carried out according to a known method. For example, solvent removal can be performed by subjecting the coating film on which the aforementioned depression/elevation transfer has been performed to drying by, e.g., hot air drying, infrared drying, and so forth.

An electrode in which an electrode active material layer is formed on an electrode current collector can be obtained by carrying out the solvent removal step S105.

In order to adjust the areal weight, density, and so forth of the electrode active material layer, an additional step (pressing process step) may be performed in which a pressing process is carried out on the electrode active material layer that has been formed. This pressing process step may be carried out by a known method.

A method for carrying out steps S102 to S105 continuously will also be described, with reference to the figures, as a desired embodiment of the method according to the present embodiment for producing secondary battery electrodes.

FIG. 5 is an explanatory diagram that structurally illustrates the schematic configuration of an electrode production apparatus 70 that is provided with a roll sheeting unit.

Considered broadly, the electrode production apparatus 70 is provided with the following: a sheeting unit 40, which forms a coating film 33 by supplying a moisture powder 32 onto the surface of a sheet-shaped current collector 31 that has been transported from a feed compartment (not shown); a coating film processing unit 50, which carries out a process of forming depressions and elevations in the surface of the coating film by pressing the coating film 33 in the thickness direction; and a drying unit 60, which forms the electrode active material layer by suitably drying the coating film 33 after the process of forming depressions and elevations in the surface.

The sheeting unit 40 is provided with a supply roll 41, transfer rolls 42, 43, and 44, and a back-up roll 45, which, as in the roll sheeting device described above (FIG. 4), are each connected to driving devices (motors) (not shown), which are independent from one another.

As shown in the figure, a plurality of transfer rolls are provided in a continuous manner in the sheeting unit according to the present embodiment. The following are provided in this example: a first transfer roll 42 facing the supply roll 41, a second transfer roll 43 facing the first transfer roll, and a third transfer roll 44 facing the second transfer roll and also facing the back-up roll 45.

By establishing a configuration such as this, different sizes can be used for the gaps G1 to G4 between the individual rolls and a favorable coating film can be formed while retaining the continuous holes in the moisture powder. This is described in the following.

Using, as shown in the figure, the first gap G1 for between the supply roll 41 and the first transfer roll 42, the second gap G2 for between the first transfer roll 42 and the second transfer roll 43, the third gap G3 for between the second transfer roll 43 and the third transfer roll 44, and the fourth gap G4 for between the third transfer roll 44 and the back-up roll 45, the gap size is set as follows: the first gap G1 is a relative maximum and the second gap G2, the third gap G3, and the fourth gap G4 gradually become smaller in the indicated sequence (G1>G2>G3>G4). By carrying out such a multistage roll sheeting in which the gaps gradually decline along the direction of transport (the travel direction) of the current collector 31, excessive destruction of the aggregated particles that constitute the moisture powder 32 can be prevented, the continuous holes can be retained, and the generation of isolated voids in the aggregated particle can be prevented. The sheeting unit 40 can thus be operated as follows.

The supply roll 41, the first transfer roll 42, the second transfer roll 43, the third transfer roll 44, and the back-up roll 45 can be rotated at respectively different rotation rates because they are each connected to driving devices (motors) (not shown), which are independent from each other. Specifically, the rotation rate of the first transfer roll 42 is faster than the rotation rate of the supply roll 41, the rotation rate of the second transfer roll 43 is faster than the rotation rate of the first transfer roll 42, the rotation rate of the third transfer roll 44 is faster than the rotation rate of the second transfer roll 43, and the rotation rate of the back-up roll 45 is faster than the rotation rate of the third transfer roll 44.

A multistage roll sheeting different from that of the roll sheeting device 20 shown in FIG. 4 can be carried out by such an incremental increase in the rotation rate along the direction of current collector transport (travel direction) between the rotating rolls. By establishing at this time an incremental reduction in the first gap G1, the second gap G2, the third gap G3, and the fourth gap G4 in the indicated sequence, the gas phase state of the moisture powder 32 supplied to this sheeting unit 40 can be maintained, i.e., isolated voids are not produced to an excessive degree, and the continuous holes can be retained and the generation of isolated voids in the aggregated particle can be prevented. While this is not a particular limitation, the size (width) of the individual gaps G1 to G4 can be set in the range of approximately 10 µm to 100 µm.

The coating film processing unit 50 of the electrode production apparatus 70 is described in the following. As shown in FIG. 5, the coating film processing unit 50 is a unit that adjusts the characteristics of the coating film 33 that is applied on the surface of the current collector 31 transported from the sheeting unit 40, and in the present embodiment is provided with a press roll 52 that adjusts the density and film thickness of the coating film, and with a first depression/elevation processing roll 54 and a second depression/elevation processing roll 56 for carrying out depression/elevation transfer to the surface of the coating film. The first depression/elevation processing roll 54 and the second depression/elevation processing roll 56 in this example are therefore both roll dies, which are thus suitable for the continuous production of the secondary battery electrode. The press roll 52 is an optional component in the electrode production apparatus 70.

The press roll 52 is provided with a back-up roll 52B that sends the transported current collector 31 in the travel direction while supporting same, and with a work roll 52A, which is disposed in a position facing the back-up roll 52B and which serves to press and compress the coating film 33 in the film thickness direction. The coating film 33 composed of the moisture powder 32 in the pendular state or funicular state (desirably the funicular I state) that is formed (sheeted) on the transported current collector 31, can be pressed and compressed by this press roll 52 to a degree that does not cause the generation of isolated voids.

Suitable pressing pressures from this press roll 52, while not being particularly limited because they can vary with the film thickness and density of the target coating film (electrode active material layer), can be set at generally 0.01 MPa to 100 MPa, for example, approximately 0.1 MPa to 70 MPa.

A first depression/elevation processing roll 54 is disposed downstream in the current collector transport direction (travel direction) from the press roll 52, and is provided with the following: a first back-up roll 54B, which forwards the current collector 31 transported through the press roll 52 in the travel direction while supporting the current collector 31; and a first work roll 54A, which is disposed in a position facing the first back-up roll 54B and which executes the formation of depressions and elevations in the coating film surface by pressing the coating film 33 in the film thickness direction. That is, this first depression/elevation processing roll 54 functions as a roll die that continuously forms a relief surface, having a prescribed interval (pitch) and pattern, in the surface of the coating film by a pressing pressure at this point. The first depression/elevation processing roll 54 also functions as a second press roll. Accordingly, there is formed, in the surface of the first work roll 54A, a corresponding relief surface for forming the relief surface having a prescribed interval (pitch) and pattern in the surface of the coating film.

The appropriate pressing pressure to be applied by this first depression/elevation processing roll 54 is not particularly limited because it can vary with, for example, the density of the surface layer region of the target coating film (electrode active material layer) and the height difference (the distance between the greatest peak height and the greatest valley depth, this also applies in the following) of the relief pattern to be formed; however, it can be set at generally 1 MPa to 150 MPa, for example, approximately 5 MPa to 100 MPa.

Depressions/elevations are transferred into the surface of the coating film 33 through its passage through the first depression/elevation processing roll 54, thus forming a depression.

A second depression/elevation processing roll 56 is disposed downstream in the current collector transport direction (travel direction) from the first depression/elevation processing roll 54, and is provided with the following: a second back-up roll 56B, which forwards the current collector 31 transported across the first depression/elevation processing roll 54 in the travel direction while supporting the current collector 31; and a second work roll 56A, which is disposed in a position facing the second back-up roll 56B and which executes the formation of depressions and elevations in the coating film surface by pressing the coating film 33 in the film thickness direction. This second depression/elevation processing roll 56 functions as a roll die that continuously forms a relief surface, having a prescribed interval (pitch) and pattern, in the surface of the coating film by a pressing pressure at this point. The second depression/elevation processing roll 56 also functions as a third press roll. Accordingly, there is formed, in the surface of the second work roll 56A, a corresponding relief surface for forming the relief surface having a prescribed interval (pitch) and pattern in the surface of the coating film.

The appropriate pressing pressure to be applied by this second depression/elevation processing roll 56 is not particularly limited because it can vary with, for example, the density of the surface layer region of the target coating film (electrode active material layer) and the elevation difference (the distance between the greatest peak height and the greatest valley depth, this also applies in the following) of the relief pattern to be formed; however, it can be set at generally 1 MPa to 150 MPa, for example, approximately 5 MPa to 100 MPa.

At least a portion of the elevations (B) in the relief surface of the second work roll 56A are higher than the elevations (A) in the relief surface of the first work roll 54A.

Depression/elevation transfer is performed by the second work roll 56A by bringing the top of this higher elevation (B) into contact with the bottom of the depression in the coating film 33 that has been formed by the elevation (A) of the first depression/elevation processing roll 54.

As a result, the depth of the depression formed in the coating film 33 can be increased and the aspect ratio of the depression can be increased.

As shown in FIG. 5, a drying compartment 62, which is provided with a heating device (heater, not shown) as a drying unit 60, is disposed on the downstream side in the current collector transport direction from the coating film processing unit 50 of the electrode production apparatus 70. The drying compartment 62 dries the coating film 33 on the surface of the current collector 31 that has been transported from the coating film processing unit 50. This drying unit 60 may be the same as the drying units used in conventional electrode production apparatuses of this type, and a further detailed explanation has been omitted in particular since this is not a characteristic feature of the present disclosure.

An elongated sheet-shaped electrode for a lithium ion secondary battery is produced by subjecting the coating film 33 that has been dried to an optional pressing operation at about 50 to 200 MPa. The thusly produced sheet-shaped electrode is used, as a general sheet-shaped positive electrode or negative electrode of this type, to fabricate lithium ion secondary batteries.

A high-aspect-ratio depression can be formed in accordance with the method according to the present embodiment for producing secondary battery electrodes. As a consequence, even when the electrode active material layer has a large thickness, with the use of such a depression the charge carrier (for example, the Li ion) can easily reach to the vicinity of the electrode current collector.

The thickness of the electrode active material layer may thus be the same as heretofore, for example, about 10 μm to 500 μm; however, because a greater thickness is more advantageous, from 200 μm to 500 μm is desired and from 250 μm to 500 μm is more desired.

A gas phase-controlled moisture powder is used in the method according to the present embodiment for producing secondary battery electrodes. The electrode obtained with such a method can have the following characteristics.

(1) When the surface area of a reference area given by L cm×B cm (L and B are integers greater than or equal to 3) in the electrode active material layer is measured at n points (n is an integer greater than or equal to 5) different from each other, the average surface area is greater than or equal to $1.05 \times L \times B$ cm$^2$.

(2) The residual gas percentage ((air volume/coating film volume)×100) in the electrode active material layer is less than or equal to 10 vol %.

(3) In the void distribution in the electrode active material layer as provided by observation of the voids using synchrotron radiation X-ray laminography, the percentage for voids with a volume of greater than or equal to 2,000 μm$^3$ with respect to the total void volume (100 vol %) is less than or equal to 30 vol %.

(4) When the electrode active material layer is equally divided into two layers, i.e., an upper layer and a lower layer, in the thickness direction from the surface of the electrode active material layer to the electrode current collector, and the concentration values (mg/L) of the binder resin in the upper layer and lower layer are denoted by C1 and C2 respectively, the relationship $0.8 \leq (C1/C2) \leq 1.2$ is satisfied.

The sheet-shaped electrode produced by the method according to the present embodiment for producing secondary battery electrodes is used, as a general sheet-shaped positive electrode or negative electrode of this type, for fabricating lithium ion secondary batteries.

Figure 6:
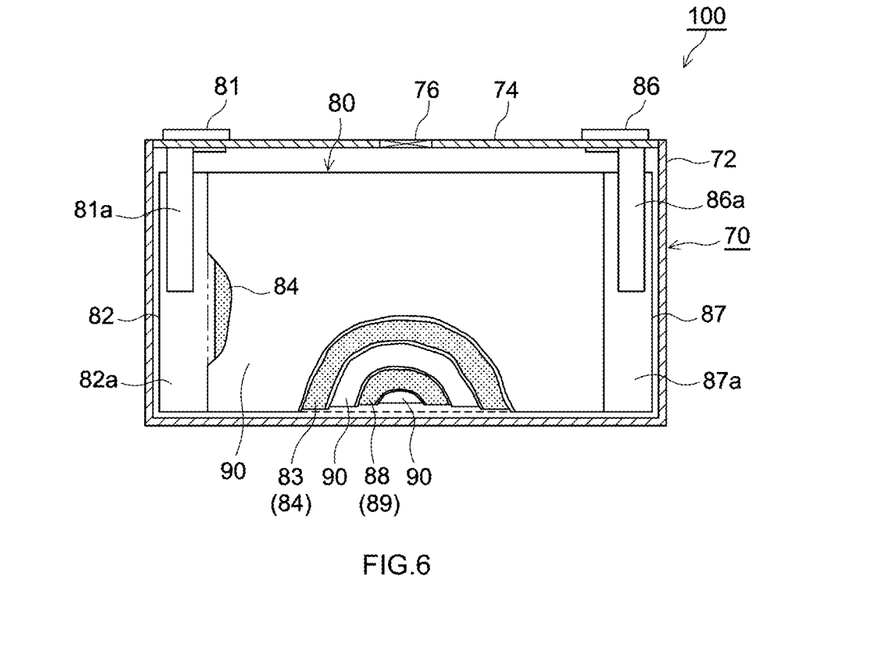
FIG. 6 is an explanatory diagram that schematically illustrates a lithium ion secondary battery that uses an electrode that has been produced by the electrode production method according to an embodiment.

FIG. 6 shows an example of a lithium ion secondary battery 100 that can be fabricated using the sheet-shaped electrode according to the present embodiment.

The lithium ion secondary battery (nonaqueous electrolyte secondary battery) 100 is a battery in which a flat wound electrode body 80 and a nonaqueous electrolyte solution (not shown) are housed in a battery case (i.e., an exterior container) 70. The battery case 70 is constructed of a box-shaped (i.e., a rectangular parallelepiped provided with a bottom) case main unit 72 having an opening at one end (corresponds to the upper end under the usual conditions of battery use), and a lid 74 that seals the opening of the case main unit 72. The wound electrode body 80 is housed in the battery case 70 (case main unit 72) with the winding axis of the wound electrode body laid sideways (i.e., the winding axis direction of the wound electrode body 80 is approximately parallel with the surface direction of the lid 74). For example, a lightweight metal material with a good thermal conductivity, i.e., aluminum, stainless steel, or nickel-plated steel, can be desirably used for the material of the battery case 70.

As shown in FIG. 6, a positive electrode terminal 81 and a negative electrode terminal 86 for external connection are disposed in the lid 74. The following are also disposed in the lid 74: an exhaust valve 76 disposed so as to release the internal pressure when the internal pressure in the battery case 70 rises to or above a prescribed level; and an injection port (not shown) for injecting the nonaqueous electrolyte solution into the battery case 70. The boundary between the battery case main unit 72 and the lid 74 of the battery case 70 can be joined (sealed) by welding the lid 74 to the peripheral edge of the opening of the battery case main unit 72.

The wound electrode body 80 is provided by laminating (stacking) a positive electrode sheet 83 and a negative electrode sheet 88 with two elongated separator sheets 90, typically composed of a porous polyolefin resin, interposed therebetween, and winding the laminate in the length direction. The positive electrode sheet 83 has a positive electrode active material layer 84 formed along the length direction on one side or both sides of an elongated sheet-shaped positive electrode current collector 82 typically made of aluminum. The negative electrode sheet 88 has a negative electrode active material layer 89 formed along the length direction on one side or both sides of an elongated sheet-shaped negative electrode current collector 87 typically made of copper. At least one of this positive electrode sheet 83 and negative electrode sheet 88 (and desirably both) is produced by the hereinabove-described production method.

The flat shape of the flat wound electrode body 80 can be formed, for example, as follows: the positive and negative electrode sheets 83, 88 and the elongated sheet-shaped separator 90 are wound to provide a cylindrical shape having the cross section of a true circle, followed by squashing (pressing) and flattening the cylindrical winding in a direction that is perpendicular to the winding axis (typically from the side surface direction). Providing this flat shape makes it possible to effect a suitable insertion into the box-shaped (rectangular parallelepiped provided with a bottom) battery case 70. For example, winding the positive and negative electrodes and the separator on the circumference of a cylindrical winding shaft can be suitably used as the winding method here.

While not intended as a particular limitation, the wound electrode body 80 can be provided by winding a laminate in such a manner that a positive electrode active material layer-free region 82a (i.e., a region where the positive electrode active material layer 84 is not formed and the positive electrode current collector 82 is thereby exposed) and a negative electrode active material layer-free region 87a (i.e., a region where the negative electrode active material layer 89 is not formed and the negative electrode current collector 87 is thereby exposed) protrude outwards from both edges in the direction of the winding axis. As a result, a wound core is formed in which, at the central region of the wound electrode body 80 in the direction of the winding axis, the positive electrode sheet 83, the negative electrode sheet 88, and the separators 90 are laminated and wound. In addition, with regard to the positive electrode sheet 83 and the negative electrode sheet 88, the positive electrode active material layer-free region 82a and the positive electrode terminal 81 (for example, made of aluminum) may be electrically connected through a positive electrode current collector plate 81a, and the negative electrode active material layer-free region 87a and the negative electrode terminal 86 (for example, made of copper or nickel) may be electrically connected through a negative electrode current collector plate 86a. The positive and negative electrode current collector plates 81a and 86a can be joined, respectively, with the positive and negative electrode active material layer-free regions 82a and 87a, for example, by ultrasound welding, resistance welding, and so forth.

It should be noted that a nonaqueous electrolyte solution obtained by incorporating a supporting electrolyte into a suitable nonaqueous solvent (typically an organic solvent) can typically be used as the nonaqueous electrolyte solution here. For example, a nonaqueous electrolyte solution that is a liquid at normal temperatures can desirably be used. The various organic solvents used in common nonaqueous electrolyte secondary batteries can be used without particular limitation as the nonaqueous solvent. For example, aprotic solvents such as carbonates, ethers, esters, nitriles, sulfones, lactones, and so forth can be used without particular limitation. A lithium salt such as $LiPF_6$ can be suitably used as the supporting electrolyte. While not a particular limitation, the concentration of the supporting electrolyte can be, for example, 0.1 to 2 mol/L.

In order to implement the herein disclosed art, it is not required that the wound electrode body 80 illustrate be used as the electrode body. For example, the lithium ion secondary battery may be a lithium ion secondary battery provided with a stacked-type electrode body formed by stacking a plurality of positive electrode sheets and negative electrode sheets with an interposed separator. Moreover, as is clear from the technical information disclosed in the present specification, the battery shape is also not limited to the rectangular shape described in the preceding. In addition, the embodiment described in the preceding has been described using the example of a nonaqueous electrolyte lithium ion secondary battery in which the electrolyte is a nonaqueous electrolyte solution; however, the herein disclosed art is not limited to this and, for example, the herein disclosed art may also be used in so-called all-solid-state batteries, which use a solid electrolyte in place of the electrolyte solution. In this case, the pendular-state or funicular-state moisture powder is constituted so as to contain, as the solid fraction, solid electrolyte in addition to the active material.

An initial charging process is generally carried out on the battery assembly provided by supplying the nonaqueous electrolyte solution and sealing the case that houses the electrode body in its interior. As with conventional lithium ion secondary batteries of this type, an external power source is connected between the negative electrode terminal and the positive electrode terminal for external connection of the battery assembly and initial charging is carried out at normal temperature (typically about 25° C.) until the voltage between the positive and negative electrode terminals reaches a prescribed value. For example, initial charging can be carried out by charging at a constant current of about 0.1 C to 10 C from the start of charging until the voltage between the terminals reaches a prescribed value (for example, 4.3 to 4.8 V), followed by constant current-constant voltage charging (CC-CV charging) in which charging is carried out at constant voltage until the state of charge (SOC) reaches about 60% to 100%.

The execution of an ageing process then provides a lithium ion secondary battery 100 that can exhibit an excellent performance. The ageing process is carried out through a high-temperature ageing in which the battery 100, after the execution thereon of the aforementioned initial charging, is maintained for at least 6 hours (desirably at least 10 hours, for example, at least 20 hours) in a high-temperature region of at least 35° C. Doing this makes it possible to increase the stability of the solid electrolyte interphase (SEI) coating, which can be produced on the surface of the negative electrode during initial charging, and to lower the internal resistance. In addition, the ability of the lithium ion secondary battery to withstand high-temperature storage can be increased. The ageing temperature is desirably about 35° C.

to 85° C. (more desirably about 40° C. to 80° C. and still more desirably about 50° C. to 70° C.). When the ageing temperature is much lower than the indicated range, the effect with regard to reducing the initial internal resistance may be insufficient. When much higher than the indicated range, the electrolyte solution may deteriorate, for example, through degradation of the nonaqueous solvent or the lithium salt, and the internal resistance may increase. The upper limit on the ageing time is not particularly limited; however, when it exceeds about 50 hours, the decline in the initial internal resistance becomes very sluggish and there may be almost no change in this resistance value. Accordingly, viewed from the standpoint of cost reduction, the ageing time desirably is about 6 to 50 hours (more desirably about 10 to 40 hours, for example, about 20 to 30 hours).

The lithium ion secondary battery 100 constructed as described in the preceding can be used in a variety of applications. An advantageous application is as a drive power source mounted in a vehicle, e.g., a battery electric vehicle (BEV), hybrid electric vehicle (HEV), plug-in hybrid electric vehicle (PHEV), and so forth. The lithium ion secondary battery 100 may also be used in the form of a battery pack provided by connecting a plurality thereof in series and/or parallel.

An example in accordance with the present disclosure is described below, but this is not intended to limit the present disclosure to the description in this example.

EXAMPLE

A gas phase-controlled moisture powder suitable for use as a positive electrode material was prepared, and a positive electrode active material layer was then formed on aluminum foil using the prepared moisture powder (positive electrode material).

In this test example, a lithium transition metal oxide ($LiNi_{1/3}Co_{1/3}Mn_{1/3}O_2$) having an average particle diameter ($D_{50}$), based on a laser diffraction/scattering method, of 20 µm was used as the positive electrode active material, polyvinylidene fluoride (PVDF) was used as the binder resin, acetylene black was used as a conductive material, and NMP was used as a nonaqueous solvent.

The solid fraction, composed of 90 mass parts of the aforementioned positive electrode active material, 2 mass parts of the PVDF, and 8 mass parts of the acetylene black, was first introduced into a stirring granulator (planetary mixer or high-speed mixer) having a mixing blade as shown in FIG. 3 and a mixing and stirring process was carried out.

Specifically, the rotational speed of the mixing blade in the mixing blade-equipped stirring granulator was set to 4,500 rpm, and a stirring and dispersion process was carried out for 15 seconds to obtain a mixture of the powder materials composed of the aforementioned solid components. NMP, which was the solvent, was added to the resulting mixture so as to provide a solids content of 90 weight %; a stirring/granulation/composite formation process was carried out for 30 seconds at a rotational speed of 300 rpm; and a stirring/microfine-sizing process was then carried out by stirring for 2 seconds at a rotational speed of 4,500 rpm. The moisture powder (positive electrode material) according to this test example was thereby prepared.

The gas phase-controlled moisture powder (positive electrode material) obtained as described above was then supplied to the sheeting section of the electrode production apparatus described above, and a coating film was transferred to the surface of a positive electrode current collector composed of a separately prepared aluminum foil.

The obtained coating film was transported to the coating film processing section and depression/elevation transfer was carried out using a first depression/elevation transfer roll having an elevation (A) of prescribed height. This resulted in the formation of a depression in the coating film. The aspect ratio was 1 when the three-dimensional shape of this depression was analyzed using a laser microscope.

Then, using a second depression/elevation transfer roll having an elevation (B) that was higher than the elevation (A), a depression/elevation transfer was carried out on the coating film such that the elevation (B) was superimposed on the depression. It was confirmed that the aspect ratio had been increased to 2 when the three-dimensional shape of the depression in the coating film was analyzed using a laser microscope.

Using a third depression/elevation transfer roll that had an elevation (C) that was higher than the elevation (B), another depression/elevation transfer was carried on the coating film such that the elevation (C) was superimposed on the depression. It was confirmed that the aspect ratio had been increased to 4 when the three-dimensional shape of the depression in the coating film was analyzed using a laser microscope.

This was heated and dried by means of the coating film drying unit to obtain an electrode on which an electrode active material layer was formed.

The elevation height of the depression/elevation transfer roll was investigated: the aspect ratio of the depression could be increased by the second depression/elevation transfer roll to a value greater than 2, but the attachment of very small amounts of the coating film to some of the elevations (B) on the transfer roll was seen. In addition, the aspect ratio of the depression could be increased by the third depression/elevation transfer roll to a value greater than 4, but the attachment of very small amounts of the coating film to some of the depressions (C) on the transfer roll was seen.

COMPARATIVE EXAMPLE

A slurry-state electrode (positive electrode) material was prepared. This positive electrode material was coated on a positive electrode current collector and was dried to form a positive electrode active material layer. Solvent was again sprayed on this positive electrode active material layer, and depression/elevation transfer was performed by pressing with a first transfer die that had a prescribed relief pattern. Large-quantity of attachment of the active material layer to the transfer die was observed, and cracking was also produced in the positive electrode active material layer. Further depression/elevation transfer was also attempted using a second transfer die having a relief pattern that had an elevation that was higher than the elevation on the first transfer die, but the depth of the depression was not increased.

As is understood from the preceding, the herein disclosed method for producing secondary battery electrodes can produce an electrode provided with an electrode active material layer that has a high-aspect-ratio depression. It is also understood that when depression/elevation transfer is repeated, defective depression/elevation transfer is very unlikely to occur when the aspect ratio of the depression is increased more than 1-fold and not more than 2-fold.

Specific examples of the present disclosure have been described in detail in the preceding, but these are only examples and do not limit the scope of the claims. The art disclosed in the claims includes various modifications and alterations to the specific examples provided as examples in the preceding.

What is claimed is:

1. A method for producing a secondary battery electrode, comprising:
   a step of preparing a moisture powder that is formed of aggregated particles that at least contain a plurality of electrode active material particles, a binder resin, and solvent, wherein a solid phase, liquid phase, and gas phase in at least 50 number % or more of the aggregated particles in the moisture powder form a pendular state or a funicular state;
   a step of forming, using the moisture powder, a coating film composed of the moisture powder, on an electrode current collector, while the gas phase remains present;
   a step of forming a depression in the coating film by carrying out, using a die having an elevation of prescribed height, depression/elevation transfer into a surface region of the coating film that has been formed;
   a step of carrying out depression/elevation transfer, using a die having an elevation higher than the elevation of prescribed height, by pressing the higher elevation into the depression that has been formed; and
   a step of forming an electrode active material layer by removing the solvent.

2. The method for producing a secondary battery electrode according to claim 1, wherein
   if the bulk specific gravity measured by placing an amount (g) of the moisture powder in a container having a prescribed volume (mL) and then leveling the moisture powder without applying a force is referred to as the loose bulk specific gravity X (g/mL), and
   the specific gravity calculated from the composition of the moisture powder on the assumption that no gas phase is present is referred to as the true specific gravity Y (g/mL), then
   the ratio of the loose bulk specific gravity X and the true specific gravity Y (Y/X) is 1.2 or more.

3. The method for producing a secondary battery electrode according to claim 1, wherein the step of carrying out depression/elevation transfer is carried out such that the aspect ratio of the depression formed by the step of forming a depression is increased more than 1-fold and not more than 2-fold.

4. The method for producing a secondary battery electrode according to claims 1, wherein the dies used in the step of forming a depression in the coating film and the step of carrying out depression/elevation transfer are each a roll die.

* * * * *